United States Patent
Reyero et al.

(10) Patent No.: US 11,032,320 B1
(45) Date of Patent: Jun. 8, 2021

(54) SYSTEMS AND METHODS FOR DYNAMIC APPLICATION LEVEL ENCRYPTION

(71) Applicant: JPMorgan Chase Bank, N.A., New York, NY (US)

(72) Inventors: Jorge Garcia Reyero, Aubonne (CH); Marco C. Pineda, Geneva (CH); Jody Spearing, Jersey City, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 270 days.

(21) Appl. No.: 15/708,534

(22) Filed: Sep. 19, 2017

Related U.S. Application Data

(60) Provisional application No. 62/396,466, filed on Sep. 19, 2016.

(51) Int. Cl.
| H04L 9/00 | (2006.01) |
| H04L 29/06 | (2006.01) |
| G06F 21/62 | (2013.01) |
| H04L 9/32 | (2006.01) |
| H04L 9/08 | (2006.01) |
| G06F 16/2458 | (2019.01) |

(52) U.S. Cl.
CPC ........ H04L 63/168 (2013.01); G06F 16/2465 (2019.01); G06F 21/6218 (2013.01); H04L 9/0894 (2013.01); H04L 9/321 (2013.01); H04L 9/3263 (2013.01); G06F 2221/2107 (2013.01)

(58) Field of Classification Search
USPC ...................................................... 713/152
See application file for complete search history.

(56) References Cited

U.S. PATENT DOCUMENTS

| 6,029,247 A * | 2/2000 | Ferguson | G06F 21/6218 713/167 |
| 7,509,384 B1 * | 3/2009 | Chen | H04L 51/04 709/204 |
| 7,669,051 B2 * | 2/2010 | Redlich | C07K 14/70575 713/166 |
| 9,100,173 B2 * | 8/2015 | Ryu | H04L 9/0863 |
| 9,224,003 B2 * | 12/2015 | Andersen | H04L 63/0457 |
| 9,723,004 B2 * | 8/2017 | Yang | H04L 63/205 |
| 2004/0030911 A1 * | 2/2004 | Isozaki | G06F 21/10 713/193 |
| 2006/0106862 A1 * | 5/2006 | Blumenau | G06F 21/10 |
| 2006/0288207 A1 * | 12/2006 | Brown | H04L 9/088 713/166 |

(Continued)

OTHER PUBLICATIONS

Wold; Apr. 21, 2016; "Method and System for Protecting and Sharing Digital Data between users in a network" WO 2016/060568.*

*Primary Examiner* — Christopher J Brown
(74) *Attorney, Agent, or Firm* — Hunton Andrews Kurth LLP

(57) ABSTRACT

Systems and methods for dynamic application level encryption are disclosed. In one embodiment, in an information processing apparatus comprising at least one computer processor, a method for dynamic application level encryption include: (1) receiving a plurality of data classification rules; (2) classifying data using the data classification rules; (3) identifying at least one protection option of a plurality of protection options for protecting the data in at least a rest state, an in-transit state, and an in-memory state; and (4) applying the at least one protection option to the data at rest.

16 Claims, 5 Drawing Sheets

(56) References Cited

U.S. PATENT DOCUMENTS

| | | | |
|---|---|---|---|
| 2013/0166904 A1* | 6/2013 | Amaya Calvo | G06F 21/6245 713/151 |
| 2014/0122875 A1* | 5/2014 | Pizi | G06F 21/6209 713/164 |
| 2017/0359370 A1* | 12/2017 | Humphries | H04L 63/10 |

* cited by examiner

SYSTEMS AND METHODS FOR DYNAMIC APPLICATION LEVEL ENCRYPTION

RELATED APPLICATIONS

The present application claims priority to U.S. Provisional Patent Application Ser. No. 62/396,466, filed Sep. 19, 2016, the disclosure of which is hereby incorporated, by reference, in its entirety.

BACKGROUND OF THE INVENTION

1. Field of the Invention

The present disclosure generally relates to systems and methods for dynamic application level encryption.

DESCRIPTION OF THE RELATED ART

Personal Information, or "PI," may exist in many states within an organization. For example, data may exist at rest (e.g., in storage), in transit (e.g., in communication between applications, devices, etc.), and in memory (e.g., stored in volatile memory). The centralization of data into core data common services and the use of cloud processing and/or storage, however, risks compromise of PI by exposing all data at once.

SUMMARY OF THE INVENTION

Systems and methods for dynamic application level encryption are disclosed. In one embodiment, in an information processing apparatus comprising at least one computer processor, a method for dynamic application level encryption include: (1) receiving a plurality of data classification rules; (2) classifying data using the data classification rules; (3) identifying at least one protection option of a plurality of protection options for protecting the data in at least a rest state, an in-transit state, and an in-memory state; and (4) applying the at least one protection option to the data at rest.

In one embodiment, the data may be classified according to a taxonomy.

In one embodiment, one of the plurality of protection options encrypts the data in a data store with a store-specific key.

In one embodiment, one of the plurality of protection options encrypts the data with a session key.

In one embodiment, one of the plurality of protection options encrypts data that is encrypted with a store-specific key with a session key, and an application server may decrypt the data.

In one embodiment, one of the plurality of protection options encrypts data that is encrypted with a store-specific key with a session key, and a web browser may decrypt the data.

In one embodiment, the method may further include retrieving a plurality of runtime rules; receiving a request to access data from a user or application, the request comprising at least one credential; and decisioning the request by applying the rules to the request.

In one embodiment, the decisioning results in one of a grant of access, a denial of access, or a conditional access.

According to another embodiment, a system for dynamic application level encryption may include a data store, an application server comprising a data access layer; and a classification/rules service. The data access layer may receive a plurality of data classification rules from the a classification/rules service; classify data using the data classification rules; identify at least one protection option of a plurality of protection options for protecting the data in at least a rest state, an in-transit state, and an in-memory state; and apply the at least one protection option to the data in the data store.

In one embodiment, the data may be classified according to a taxonomy.

In one embodiment, one of the plurality of protection options encrypts the data in a data store with a store-specific key.

In one embodiment, one of the plurality of protection options encrypts the data with a session key.

In one embodiment, one of the plurality of protection options encrypts data that is encrypted with a store-specific key with a session key, and an application server may decrypt the data.

In one embodiment, one of the plurality of protection options encrypts data that is encrypted with a store-specific key with a session key, and a web browser may decrypt the data.

In one embodiment, the system may further include a web server in communication with a user interface, and data access layer may retrieve a plurality of runtime rules from the classification/rules service. The web server may receive a request to access data from the user interface, the request comprising at least one credential. The data access layer may decision the request by applying the rules to the request.

In one embodiment, the decisioning results in one of a grant of access, a denial of access, or a conditional access.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
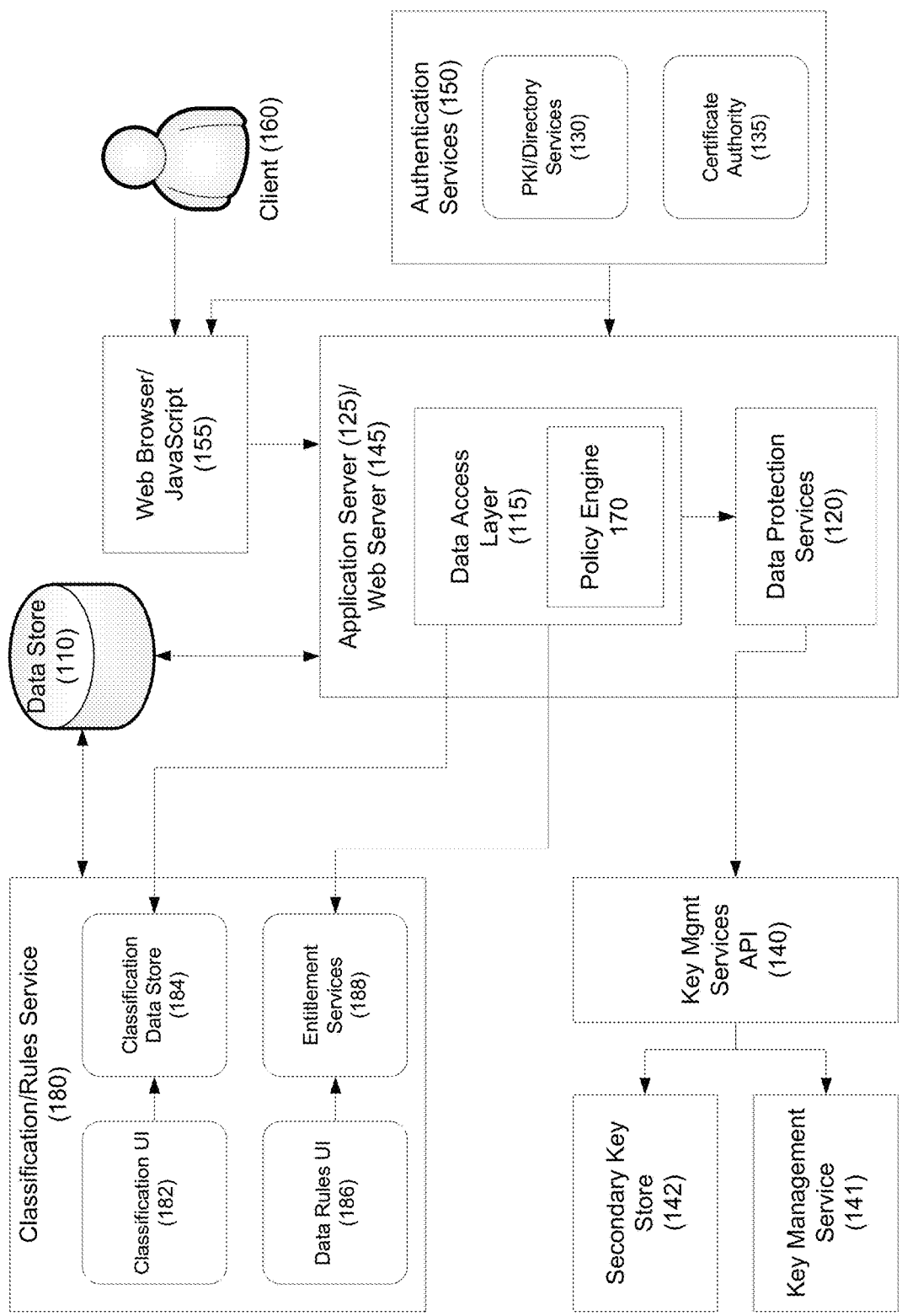
FIG. 1 depicts a static view of a system for dynamic application level encryption in a according to one embodiment.

Complex regulations, such as the General Data Protection Regulation require entities to know the location of data at all times. Embodiments provide the ability to track data knowing at every moment where sensitive data is, who is accessing the data, and how the data is stored.

Embodiments disclosed herein are directed to a dynamic application level encryption platform/framework that may involve controlled key management and authentication/authorization platforms to ensure that decryption only occurs for a user that is authorized to access the data, and is authenticated at the time of access.

In one embodiment, protection may be provided for individual applications, for infrastructure (e.g., hardware), and/or the end user.

Embodiments may provide some or all of the following: (1) the reduction or prevention of unauthorized bulk extract of sensitive data by, for example, administrators of the application or underlying infrastructure platforms, attackers exploiting application flaws, e.g., SQL injection, corrupt, coerced or compromised authorized users through supported application interfaces, etc.; (2) support for compliance driven data access restrictions to specified environments, by jurisdiction, organization, or security level, to specified users, by job function and explicit authorization, to specified users, by legal entity, geolocation and citizenship, etc.; and (3) protection of data in transit and processing through untrusted or uncontrolled environments in transit, when the data is granularly encrypted, in processing on platforms where encryption configuration is outsourced to indirectly controlled parties, when primary controls fail and the data is copied, leaked or otherwise exposed to low control environments, etc.

In one embodiment, multiple non-exclusive protection options may be available. The level of encryption used or applied at each protection option may be based on a consideration of application impact and security. For example, there may be four options, or levels, of protection that can be applied providing different security. These options are not exclusive to one application, and they may be decided based on the needs of the data, the sensitivity of the data, etc. This decision on which protection option to use may be based on, for example, the classification of the data and the rules applied.

The first protection option may provide full access to at rest encryption key in application context-high performance and minimal functional impact. An environment compromise may result in full access to the data set. An administrator may also have access to the full data set.

The second protection option may provide access to a session specific encryption key in application context-performance impact for decrypt/encrypt, full access to data for app. The environment compromise/administrator may gain full access to the data set, but cannot sustain it once access is revoked.

The third protection option may provide access to a session specific encryption key tied to user permissions-performance impact for decrypt/encrypt, network callout, authorization call. The environment administrator cannot gain any access to data without an active session. The session rate may be limited to subset of users data.

The fourth protection option may provide access to a session specific encryption key in endpoint (browser, mobile) context. This may have an impact on performance and function. In one embodiment, there may be no compromise of data possible in administrator environment without full break of the crypto algorithm (e.g., AES-256).

In one embodiment, the protection options are not exclusive, and more than one protection option may be used at a time. In addition, the number of protection options and their nomenclature disclosed herein is exemplary and may vary as is necessary and/or desired. For example, any given application may use any combination of these protection options. The protection option(s) used may be based, for example, on the sensitivity of the data. For example, the first protection option may be used for low risk data, the third protection option may be used for high risk data, and the fourth protection option may be used for region restricted (e.g., Swiss/Bahamas), or highest risk, data.

In one embodiment, the protection option(s) used may be based on, for example, the classification of the data, a policy engine, and an encryption/decryption framework. For example, an encryption/decryption layer may encrypt, decrypt, mask, redact, and/or tokenize data, and provide access key management in a secure way. Safe key management may include the secure transmission of keys and secure storage of the keys in memory. In one embodiment, the keys may be masked.

In one embodiment, the protection option(s) used may be based on one or more data attribute. For example, any attribute of data may have a classification. This classification is based on, for example, logical attribute (e.g., name, surname, telephone number, etc.), jurisdiction/location (e.g., United States, United Kingdom, Switzerland, etc.), organization/team (e.g., Asset Management, Investment Banking, etc.) and subject area (e.g., client-related information, employee-related information, etc.).

In one embodiment, a policy engine may provide the access to data based on a rule or policy engine. The policy engine may make a decision based on the classification of the data and the end user information.

Referring to FIG. 1, a system for dynamic application level encryption is disclosed according to one embodiment.

The untrusted environment may include one or more data store 110, application server 125, PKI/Directory services 130, and web server 145.

In one embodiment, data store 110 may be any suitable data store, including cloud storage, local storage, etc. In one embodiment, data store 110 may be accessible by one or more entity, including users, administrators, etc.

In one embodiment, data stored in data store 110 may be encrypted with a store-specific key. In one embodiment, each client, application, etc. may have its own store-specific key. In one embodiment, key alias may be used. For example, individual applications may not manage keys, as this is performed by the framework. In one embodiment, applications will be assigned with key alias.

In one embodiment, a key alias may be used by application server 125 for encryption only, and may be unique for an application. A key alias in an application may always fetch latest version of encryption key.

In one embodiment, a key id may be used for decryption only. A key id attribute may identify an instance of encryption key of an application. An application may have multiple versions of an encryption key, and each version of key may be uniquely identified with a key id.

In one embodiment, application server 125 may encapsulate the key id with the cipher text after encryption. This way, server 125 knows which version of encryption key to use for decryption. Thus:

$$\text{cipher text} = \text{keyId} + IV + \text{<other metadata>} + \text{encrypted text}$$

Application server 125 may be any centralized server that may communicate with data store 110 and web server 145 to serve requests from client 160. Application server 125 may include a static classification of data and the rules engine where decisions about accessing the data will be taken. For example, application server 125 may contain data access layer 115 and data protection services 120. In one embodiment, application server 125 may include an instance of policy engine 170 (not shown) during runtime.

PKI/Directory Services 130 may be any suitable key store. In one embodiment, PKI/Directory Services 130 may store keys, such as store-specific keys, application-specific keys, and client-specific keys.

Web server 145 may be any suitable web server that interfaces between client 160 and application server 125.

The trusted environment may include a service for data access layer 115, data protection services 120, certificate authority 135, key management services 140, and authentication services 150.

In one embodiment, data access layer 115 may control the flow of data. For example, data access layer may control the ability to access data through the combined evaluation of data specific classification metadata and the evaluation of security policies.

In one embodiment data access layer 115 may have a classification of one or more data attribute, such as a logical attribute (e.g., name, surname, telephone, etc.), a jurisdiction/location (e.g., United States, United Kingdom, Switzerland, etc.), an organization/team (e.g., Asset Management, Investment Banking, etc.) and a subject area (e.g., client-related information, employee-related information, etc.). This classification may, for example, be done prior the execution of the application(s). The data at rest may be classified prior the usage of the data from the framework, and may be generated according to another sets of classification rules.

In one embodiment, data access layer 115 may implement policy engine 170, in which the ability to gain access to the data is based on a rule or policy maintained by classification/rules service 180. Policy engine 170 may make an access decision based on, for example, the classification of the data, and/or the end user information.

In one embodiment, classification/rules service 180 may include classification GUI 182, classification data store 184, data rules GUI 186, and entitlement services 188. In one embodiment, a user (not shown) may interact with classification/rules service 180 using classification UI 182 and/or data rules UI 186 to enter, access, modify, and/or delete classifications and rules as is necessary and/or desired.

In one embodiment, classification UI 182 may be a user interface where classification rules are generated. Classification Data Store 184 may be a data store where classification rules are stored. In one embodiment, rules may be common for all the applications, and may not dependent to any application. In one embodiment, a classification may be generated based on, for example, the logical attribute, jurisdiction, organization and subject area.

In one embodiment, data rules UI 186 may be a user interface where data rules or policy rules are generated. These policy rules may be used at execution time/runtime by the policy engine.

In one embodiment, entitlements service 188 may serve as a repository for data rules. These rules may be translated into policies that can be used by applications. In one embodiment, these data rules are common for all the applications, while application specific rules may be created and embedded in the general rules.

In one embodiment, data store 110 may be a data store for one or more application. A metadata model may be used to classify the physical model according to the rules stored in classification data store 184. This classification may occur before an application is executed.

In one embodiment, policy server 170 may be embedded in the application as data access Layer 115, or it may be exposed as a service in a more secure location. Policy server 170 may execute the policies stored in entitlements service 188 based on the classification of the data store of the application, the request user (user conditions) and the data rules.

Data protection services 120 may provide governance and controls to ensure proper protection and handling of sensitive information. In one embodiment, the governance may be provided by policy engine 170.

Certificate authority 135 may issue, manage, and verify digital certificates while acting as a trusted third party source by all involved.

Key management services 140 may provide services such as generation, storage, exchange, details, replacement and destruction of cryptographic keys. In one embodiment, key management services API 140 may retrieve keys from key management service 141 and secondary key store 142. Key management service API 140 may provide services such as generation, storage, exchange, details, replacement and destruction of cryptographic keys.

Authentication services 150 may authenticate client 160 using any suitable authentication process.

The client control environment may include web browser/Javascript 155, and client 160. In one embodiment, web browser/Javascript 155 may interface with client 160 and web server 145 to communicate requests from client 160 to web server 145, and provide output from web server 145 to client 160. In one embodiment, web browser/Javascript 155 may further interface with authentication services 150 to authenticate client 160.

Figure 2:
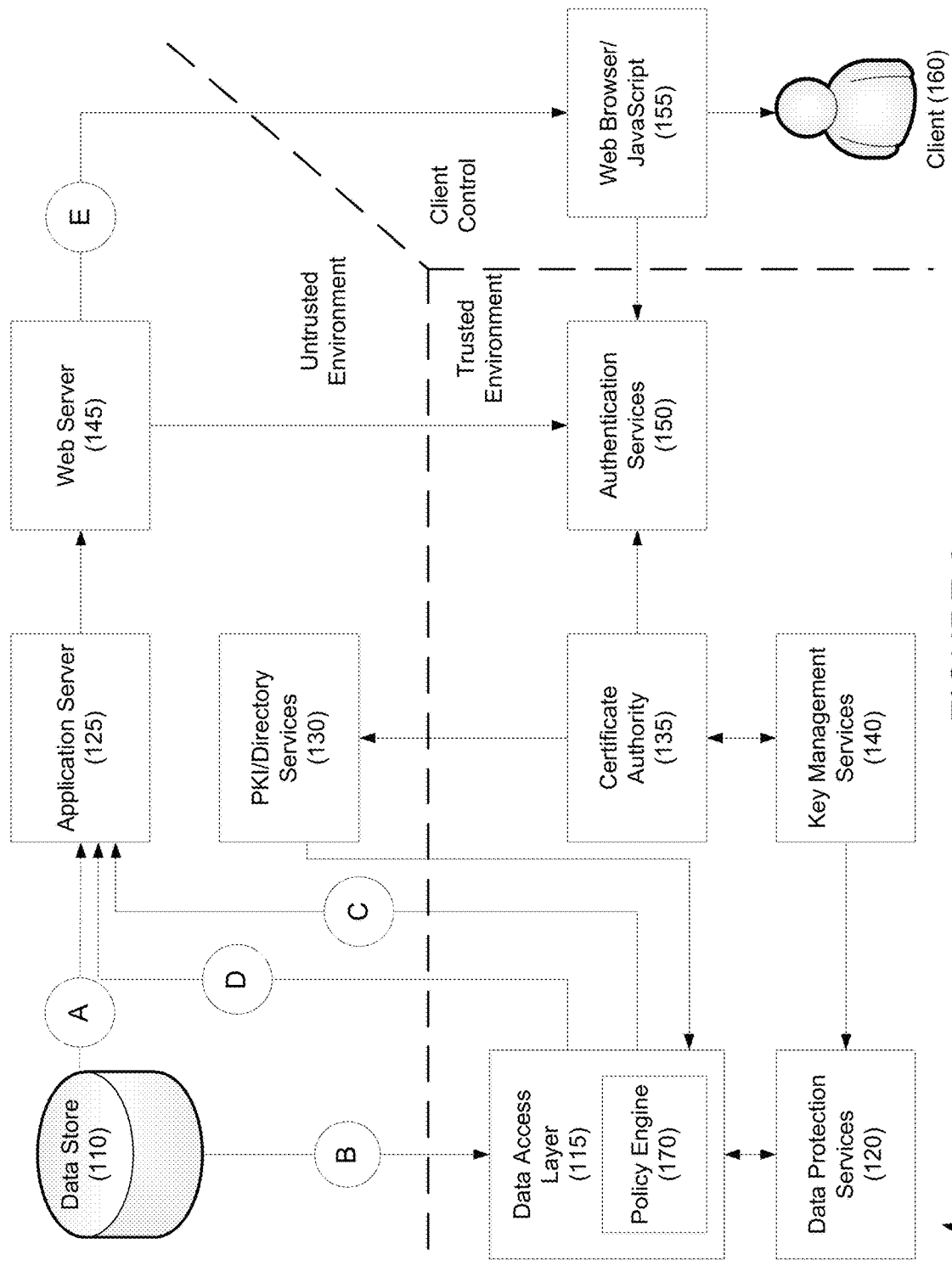
FIG. 2 depicts an execution view of a system for dynamic application level encryption according to one embodiment.

Referring to FIG. 2, an execution view of a system for dynamic application level encryption is disclosed according to another embodiment.

System 100 may include an Untrusted environment, a Trusted environment, and a Client Control environment.

In one embodiment, letters A, B, C, D, and E represent "attack paths" at which data may be attacked in the untrusted environment.

In one embodiment, on attack path A, data in transit between data store 110 and application server 125 may be protected from snooping or tampering by other users of the network. Data stored in data store 110 may be protected from inspection via shared infrastructure services such as SAN, NAS and backup systems. Attacks with database/system administrator, or authorized user permissions, via SSL certificate tampering, and via application flaws are, however, unmitigated. This is Protection Option 1—data encrypted at rest (e.g., in data store 110) being decrypted in application server 125.

In order to address these attacks on attack path A, and attacks on attack path B, data at rest, such as data in data store 110, may be encrypted with a key, such as a store-specific key. In one embodiment, the store-specific key may be from PKI/Directory services 130. In one embodiment, the store-specific key may be stored outside of data store 110. The key may be made available to the application for decryption. This may further mitigates attacks by database and system administrators on the data store. Attacks on the application server, web server, client, authorized users, and application flaws may be unmitigated.

In one embodiment, attacks on attack path C may be addressed by using a session-specific key to encrypt data up to the application server. In addition to achieving the protections from attack paths B and C, attacks on the application server do not provide full access to the data store. The session key may be limited to data elements authorized for use by that application, and the key can be revoked at any time without requiring rekeying of the store. Attacks on the web server, client, authorized users, and application flaws are limited to the permitted data set. This is Protection Option 2—data encrypted at rest (e.g., in data store 110) being decrypted and re-encrypted with a session key (e.g., by data access layer 115). Application server 125 may decrypt the data encrypted with the session key.

In one embodiment, the use of session keys may have a performance impact on encryption and decryption actions, as well as in providing a full access to the data for an application. If the environment is compromised, or if an administrator gains access, the access may not be sustained once access to the data set is revoked.

In embodiments, additional control may be achieved by using decryption rate limiting, preventing decryption of the entire data set during a compromise.

In one embodiment, attacks on attack path D may be addressed by using a user specific key that may be available only to the organization's data protection fabric and the client endpoint. All the protections from attack path B are achieved, and database, system administrators, and application exploits on the application server are unable to decrypt data in the absence of an authorized users key. The application is no longer to understand the data content or run query/search/joins on it.

In one embodiment, attack path E may be addressed by encrypting data to client 160 with the client specific session key. Administrators and attackers of all types are prevented from any inspection or tampering of the data.

Protection Option 3 may address attack paths B, C, D, and E. In one embodiment, Protection Option 3 may provide full mitigation of administrators and attacks on the data store, web server and intervening network paths, and partial mitigation of administrators, application flaws, and authorized users on the application server through authenticated user binding and rate limiting.

Thus, data encrypted at rest (e.g., stored in data store 110) being decrypted and re-encrypted with a session key by data access layer 115. Application server 125 may decrypt the data encrypted with the session key and web browser/Javascript 155. The difference between protection option 2 and protection option 3 is that one or more session specific keys may be tied with user permission. In one embodiment, policy engine 170 is embedded in application server 125.

Protection Option 4 may address attack paths B, D, and E. It may provide full mitigation throughout the stack for administrators, and partial significant mitigation of application flaws and authorized users through authenticated user binding and rate limiting. In one embodiment, Protection Option 4 may have a performance and functional impact. For example, without full break of crypto algorithm (e.g., AES-256), data cannot be compromised.

Thus, data encrypted at rest (e.g., stored in data store 110) may be decrypted and re-encrypted with a session key by data access layer 115. Web browser/Javascript 155 may decrypt the data; thus, the data is fully protected during the transit in untrusted environment.

In one embodiment, keys may be retrieved on a need basis during the encryption/decryption of data at any end or intermediary point which has access to the data. Keys may be cached for certain configurable periods of time to reduce network loads and application throughput as required. In one embodiment, the keys may be protected in memory, for example, with an XOR operation.

In one embodiment, the level of encryption may depend on the confidentiality and/or sensitivity of the data, the nature of the application (e.g. internal/external facing application, whether it is in the trusted/untrusted environment, etc.), regulations, etc.

In one embodiment, data may be encrypted using NIST-approved AES 256 Block Cipher with support for various modes of operation (CBC and GCM). In another embodiment, tokenization, other types of encryption (like format preserving encryption) masking, etc. could be used in addition to, or instead of, the encryption based, for example, on the policy rules.

In one embodiment, data may be encrypted within or as close to web browser/Javascript 155/client 160 as possible. For example, data may be encrypted by data access layer 115, data protection services 120, etc. The element that encrypts the data may depend on the metadata model and the classification used.

In one embodiment, data in transmission between, for example, data access layer 115 and application server 125 may be encrypted using, for example, a session-specific key and/or an application-specific key.

In addition, data in transmission between, for example, data access layer 115 and application server 125, application server 125 and web server 145, and web server 145 and web browser/Javascript 155 may be encrypted using, for example, a client-specific key.

Figure 3:
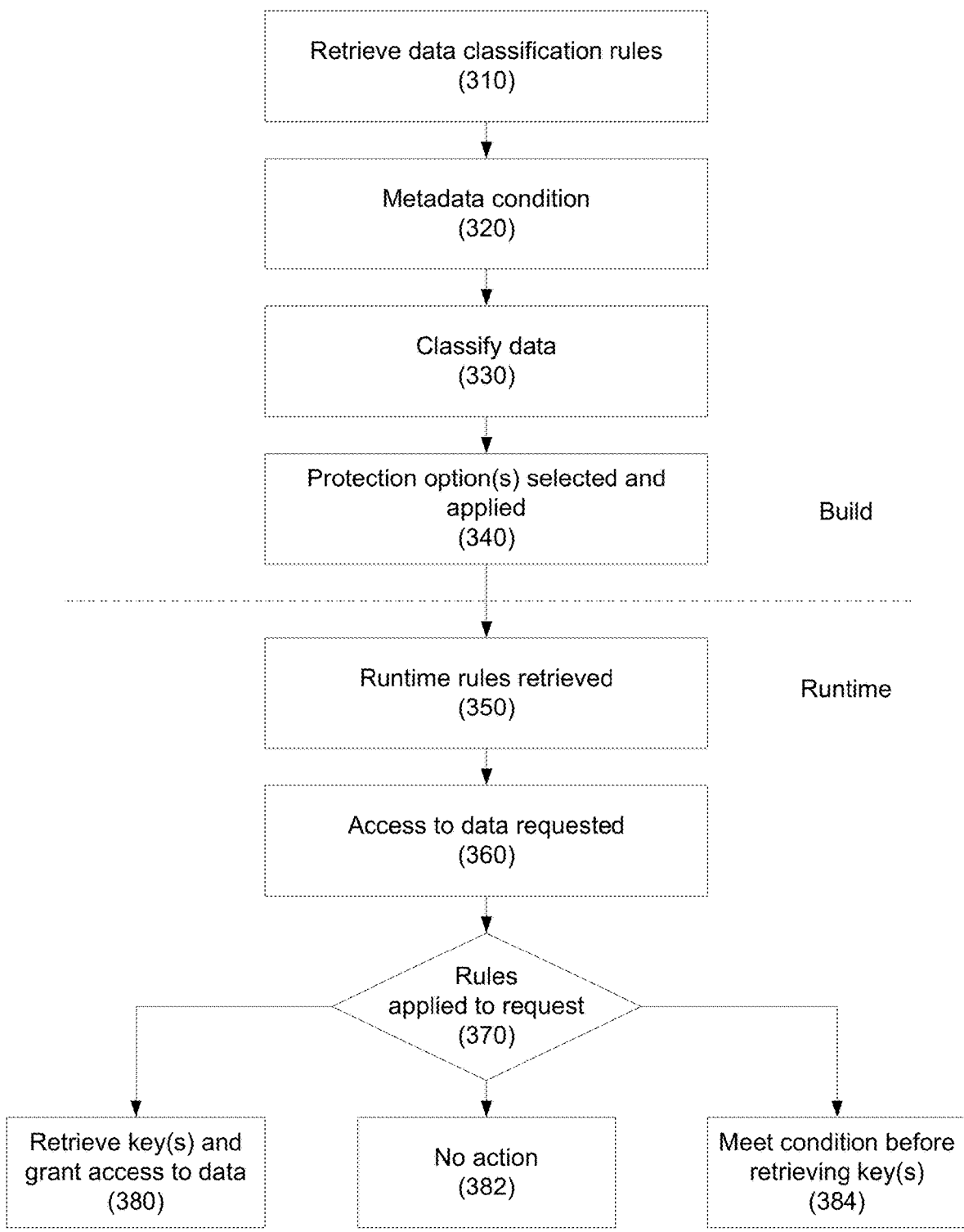
FIG. 3 depicts a method for dynamic application level encryption according to one embodiment.
Figure 4:
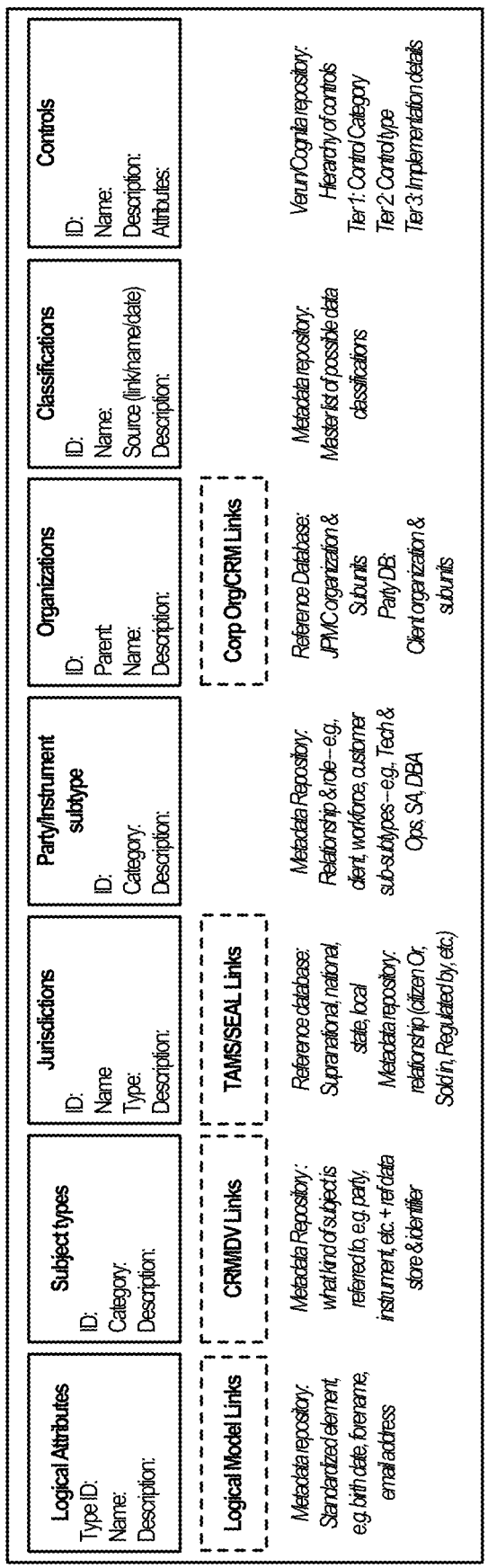
FIG. 4 depicts exemplary classification and rules guidelines according to one embodiment.

Referring to FIG. 3, a method for dynamic application level encryption at build time is disclosed according to one embodiment. In step 310, classification rules for classifying data may be retrieved. In one embodiment, the classification rules may be based on a taxonomy. An exemplary taxonomy is provided in FIG. 4.

In step 320, a metadata condition may be met. For example, using one or more classification rule, the metadata/attributes/rows in a physical model may cause the data to be classified.

In step 330, the data may be classified. For example, the data may be classified according to one or more of logical attributes, subject types, jurisdictions, party/instrument subtype, organizations, classifications, controls, etc.

In step 340, one or more protection option may be selected and applied to the data based on the data classification and/or rules. In one embodiment, the data that is stored in a data store may be encrypted according to the selected protection option. For example, one or more of the four protection options disclosed above may be used.

In step 350, runtime rules for data access may be retrieved. In one embodiment, this may include additional access restrictions, entitlement data, etc. In one embodiment, the runtime rules may further identify one or more of the protection options discussed above to be applied in response to a runtime request.

In step 360, at runtime, a request to access data may be received from a user, an application, etc. In one embodiment, the user, application, etc. may provide credentials.

In step 370, the rules may be applied to the request. In one embodiment, the policy engine may apply the rules to the data classification and the user/application identification, credentials, etc., resulting in an access decision. In one embodiment, the access decision, which may be based on a XACML—"eXtensible Access Control Markup Language"—architecture, may be permit access (step 380), deny access (step 382), or require a condition to be met (step 384) before access can be granted. For example, in step 380, the data and appropriate key(s) may be retrieved and decrypted for access by the user/application. In step 382, the data may not be decrypted. And, in step 384, an obligation, such as encrypting with a session key before access is provided, may be required.

Figure 5:
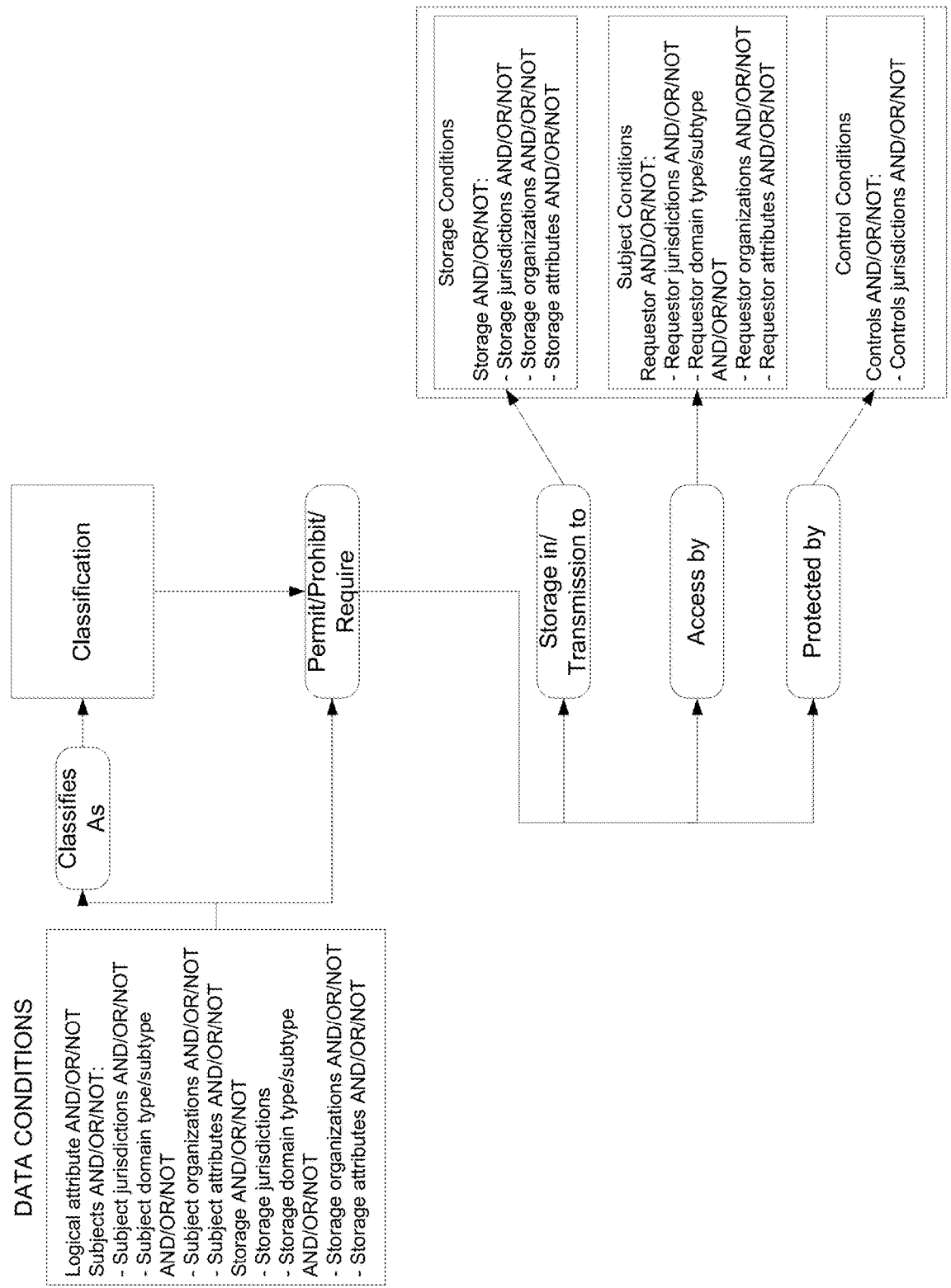
FIG. 5 depicts a method for dynamic application level encryption according to one embodiment.

Referring to FIG. 5, an exemplary embodiment of a method for dynamic application level encryption is disclosed according to one embodiment Although several embodiments have been disclosed, it should be recognized that these embodiments are not exclusive to each other.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for dynamic application level encryption, comprising:
   in an information processing apparatus comprising at least one computer processor:
      receiving a plurality of data classification rules;
      classifying each of a first and second set of data using the data classification rules;
      identifying at least one protection option of a plurality of protection options for protecting each of the first and second sets of the data in at least a rest state, an in-transit state, and an in-memory state based on the classification of the data;
      applying the identified protection options to the first and second sets of data at rest at a data store; wherein the protection option applied to the first set of data is different than the protection option applied to the second set of data; and
      utilizing the first set and second sets of data simultaneously in accordance with the protection options applied to each of the first and second sets of data by an application in an application server;
      wherein one of the plurality of protection options includes the application server decrypting data that is encrypted with a store-specific key at the data store, and encrypting the data with a session key, and a web browser decrypting the data encrypted with the session key.

2. The method of claim 1, wherein the data is classified according to a taxonomy.

3. The method of claim 1, wherein one of the plurality of protection options encrypts the data in a data store with a store-specific key.

4. The method of claim 1, wherein one of the plurality of protection options encrypts the data with a session key.

5. The method of claim 1, wherein one of the plurality of protection options encrypts data that is encrypted with a store-specific key with a session key, and an application server may decrypt the data.

6. The method of claim 1, further comprising:
retrieving a plurality of runtime rules;
receiving a request to access data from a user or application, the request comprising at least one credential;
decisioning the request by applying the rules to the request.

7. The method of claim 6, wherein the decisioning results in one of a grant of access, a denial of access, or a conditional access.

8. A system for dynamic application level encryption, comprising:
a data store,
an application server comprising a data access layer; and
a classification/rules service;
wherein:
the data access layer receives a plurality of data classification rules from the a classification/rules service;
the data access layer classifies each of a first and a second set of data using the data classification rules;
the data access layer identifies at least one protection options of a plurality of protection options for protecting each of the first and second sets of data in at least a rest state, an in-transit state, and an in-memory state based on the classification of the data;
the data access layer applies the identified protection options to the first and second sets of data in the data store; wherein the protection option applied to the first set of data is different than the protection option applied to the second set of data; and
utilizing the first set and second sets of data simultaneously in accordance with the protection options applied to each of the first and second sets of data by an application in an application server;
wherein one of the plurality of protection options includes the application server decrypting data that is encrypted with a store-specific key at the data store, and encrypting the data with a session key, and a web browser decrypting the data encrypted with the session key.

9. The system of claim 8, wherein the data is classified according to a taxonomy.

10. The system of claim 8, wherein one of the plurality of protection options encrypts the data in a data store with a store-specific key.

11. The system of claim 8, wherein one of the plurality of protection options encrypts the data with a session key.

12. The system of claim 8, wherein one of the plurality of protection options encrypts data that is encrypted with a store-specific key with a session key, and an application server may decrypt the data.

13. The system of claim 8, further comprising:
a web server in communication with a user interface;
wherein:
the data access layer retrieves a plurality of runtime rules from the classification/rules service;
the web server receives a request to access data from the user interface, the request comprising at least one credential;
the data access layer decisions the request by applying the rules to the request.

14. The method of claim 13, wherein the decisioning results in one of a grant of access, a denial of access, or a conditional access.

15. The method of claim 1, wherein one of the plurality of protection options includes decryption rate limiting.

16. The method of claim 15, wherein the one of the plurality of protection option further includes authenticated user binding.

* * * * *